United States Patent [19]

Mynhier

[11] 4,239,266
[45] Dec. 16, 1980

[54] PIPE CONNECTOR APPARATUS

[75] Inventor: Charles R. Mynhier, Houston, Tex.

[73] Assignee: Bill B. Berryhill, Bellaire, Tex.

[21] Appl. No.: 869,821

[22] Filed: Jan. 16, 1978

[51] Int. Cl.³ .............................................. F16L 21/04
[52] U.S. Cl. .................................... 285/323; 285/348; 285/375
[58] Field of Search ............... 285/348, 323, 322, 18, 285/375, 310, 309, 382.7

[56] References Cited

U.S. PATENT DOCUMENTS

| | | | |
|---|---|---|---|
| 1,604,580 | 10/1926 | Jaques | 285/147 |
| 1,654,463 | 12/1927 | Jaques | 285/322 X |
| 1,774,196 | 8/1930 | Davis | 285/147 |
| 2,205,910 | 6/1940 | Raybould | 285/DIG. 11 |
| 2,339,771 | 1/1944 | Davies | 285/348 X |
| 2,848,256 | 8/1958 | Tyler | 285/375 X |
| 2,937,038 | 5/1960 | Gondek | 285/323 |
| 3,159,414 | 12/1964 | Widman | 285/348 |
| 3,669,475 | 6/1972 | Luckenbill et al. | 285/404 X |
| 3,679,235 | 7/1972 | Faccou | 285/348 X |
| 3,977,702 | 8/1976 | White, Jr. et al. | 285/145 |
| 3,984,131 | 10/1976 | Gingrich, Jr. et al. | 285/348 |
| 3,997,199 | 12/1976 | Arnold | 285/322 |
| 4,000,921 | 1/1977 | Daspit | 285/339 X |
| 4,006,921 | 2/1977 | Mohr | 285/348 X |
| 4,062,572 | 12/1977 | Davis | 285/382.7 X |
| 4,078,832 | 3/1978 | Wittman | 285/375 X |
| 4,127,289 | 11/1978 | Daspit | 285/348 X |

FOREIGN PATENT DOCUMENTS 653108  2/1963  Italy ........................................ 285/323

*Primary Examiner*—Thomas F. Callaghan
*Attorney, Agent, or Firm*—Bill B. Berryhill

[57] ABSTRACT

Apparatus for connecting a cylindrical first member to a second member which may comprise: a tubular body adapted to receive one end of the first member and for connection to the second member; an annular seal assembly carried by the body and movable from a relaxed position, in which one end of the first member may be axially received therein, to a compressed position, sealingly engaging one end of the first member; a seal load ring engageable with the seal assembly and axially movable relative to the body for moving the seal assembly to its compressed position; a gripper assembly axially spaced from the seal assembly and movable from a radially expanded position in which the first member may be axially received by and displaced from the body, to a radially contracted position gripping the exterior of the first member and preventing its axial displacement from the body; and a gripper load ring engageable with the gripper assembly and axially movable relative to the body for moving the gripper assembly to its contracted position.

21 Claims, 6 Drawing Figures

PIPE CONNECTOR APPARATUS

BACKGROUND OF THE INVENTION

1. Field of the Invention

The present invention pertains to pipe connector apparatus and methods of installation. Specifically, it pertains to apparatus and installation methods for connecting pipes or conduits in particularly difficult environments, e.g. subsea environments.

2. Description of the Prior Art

It is known to connect pipes using tapered slip wedges and correspondingly tapered slip bowls for forcing the slip wedges from a radially expanded position, in which a pipe member may be received therein, to a radially contracted position in which the slips grip the exterior of the pipe firmly clamping or wedging the pipe in a fixed position. In prior art connectors, the slips are moved to the gripping or clamped position by relative movement of the slip bowl and slips. Such movement is generally effected by application of fluid under pressure to an annular piston or a plurality of piston rams arranged around the axis of the pipe connector. Examples of such prior art apparatus may be seen in U.S. Pat. Nos. 3,393,926; 3,704,033 and 3,986,728.

In subaquatic environments, hydraulic pipe connectors have the advantage of requiring only that a diver connect the source of hydraulic pressure to a pressure port on the connector to enable slip wedges to be forced into an engaged position to clamp the connector against the pipe. However, such arrangements have a disadvantage in that when the hydraulic pressure source is later disconnected from the pipe connector, there are problems of sealing against escape of hydraulic fluid in order to prevent disengagement of the slips. Furthermore, such connectors are relatively expensive and with continuing development in underwater welding, may not remain competitive for many years.

To eliminate the problems associated with hydraulic actuation, connectors have been developed for actuation by non-return mechanical means. In U.S. Pat. No. 3,999,782, a connector is disclosed in which the slips are driven apart by a screw arrangement, comprising thrust sleeves threadedly engageable with a common drive sleeve. The drive sleeve may be driven by a worm wheel arrangement so that as the worm is rotated, the worm wheel rotates the drive sleeve to drive the thrust sleeves and slips away from the worm wheel by virtue of opposed hand threaded interengagement between the thrust sleeve and the drive sleeve. Another but more simple mechanically actuated connector is described and claimed in co-pending United States Patent Application Ser. No. 788,159.

Even though recently developed mechanical connectors have eliminated some of the problems associated with hydraulic connectors, they do not provide the ultimate answer in all connector applications. Furthermore, while they may be less expensive to install and maintain than hydraulic connectors, they are still relatively expensive and may not long compete with improved underwater welding processes. Furthermore, while some pipe connectors of the prior art provide means for further tightening of the annular seals associated therewith, such means could be improved in reliability and effectiveness.

SUMMARY OF THE INVENTION

In the present invention, a pipe connector is provided for connecting a first pipe member to a second pipe member including a tubular body adapted to receive one end of the first pipe member and provided with means for connecting the body to the second pipe member. An annular seal assembly is carried by the body for movement from a relaxed position, in which one end of the first pipe member may be axially received therein, to a compressed position, sealingly engaging the end of the first member. A gripper assembly is axially spaced from the seal assembly for movement from a radially expanded position in which the first pipe member may be axially received by and displaced from the body, to a radially contracted position gripping the exterior of the first pipe member and preventing its axial displacement from the body. An actuating assembly is carried by the body and includes a gripper load ring engageable with the gripper assembly and axially movable relative to the body for moving the gripper assembly to its contracted position. The actuating assembly also includes a seal load ring engageable with the seal assembly and axially movable relative to the body for moving the seal assembly to its compressed position.

The actuating assembly includes means for simultaneously applying axial forces to the gripper load ring and the seal load ring for effecting axial movements thereof. The actuating assembly may also include means for applying additional axial forces to the seal load ring without applying additional forces to the gripper load ring.

The connector of the present invention eliminates some of the major problems associated with hydraulic connectors, namely subsequent disengagement of the slips and leaks resulting therefrom. In addition, it offers means of subsequently applying additional forces to the seal assembly to stop leaks which may occur after extended use. Its manufacture, operation and maintenance are substantially improved over connectors of the prior art. Many other objects and advantages of the invention will be apparent from the description which follows in conjunction with the accompanying drawings.

DESCRIPTION OF A PREFERRED EMBODIMENT

Figure 1:
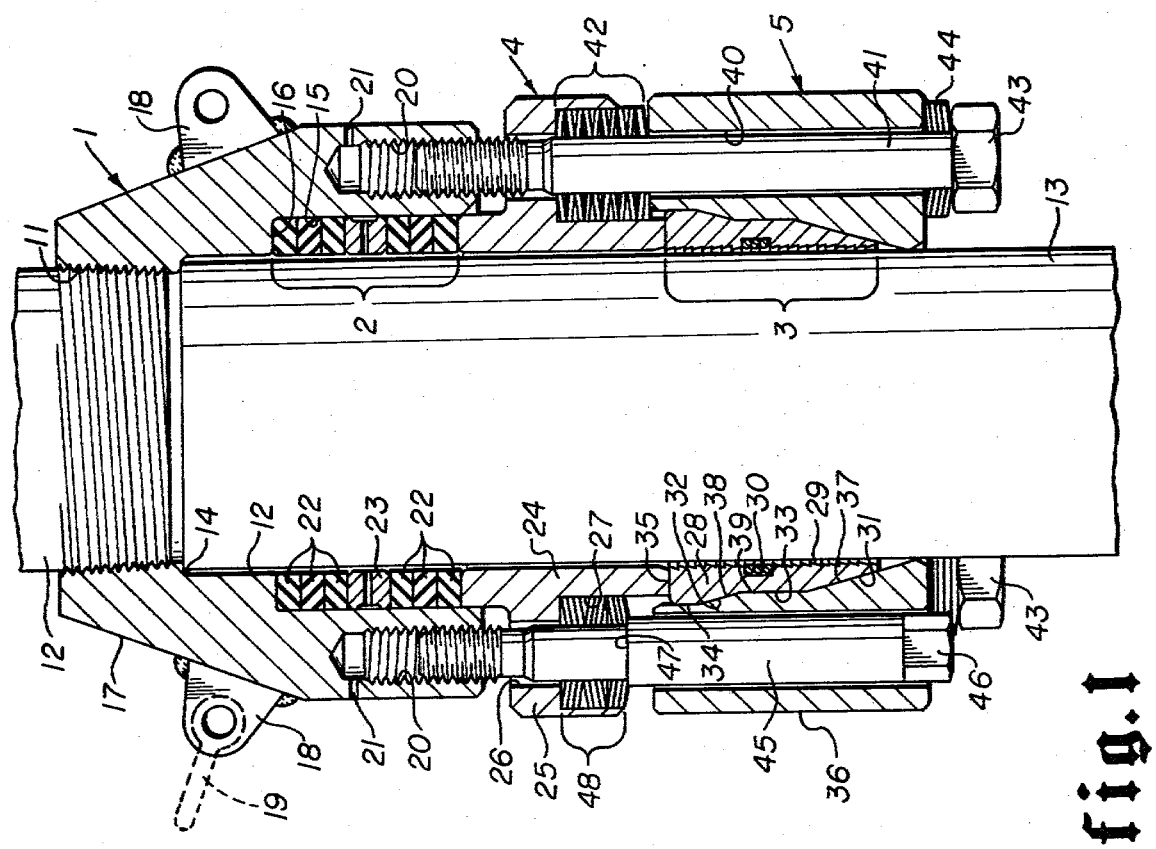
FIG. 1 is a sectional elevation view, taken along line 1—1 of FIG. 2, of a connector according to a preferred embodiment of the invention, showing the connector in its initial or unset position.
Figures 2, 4:
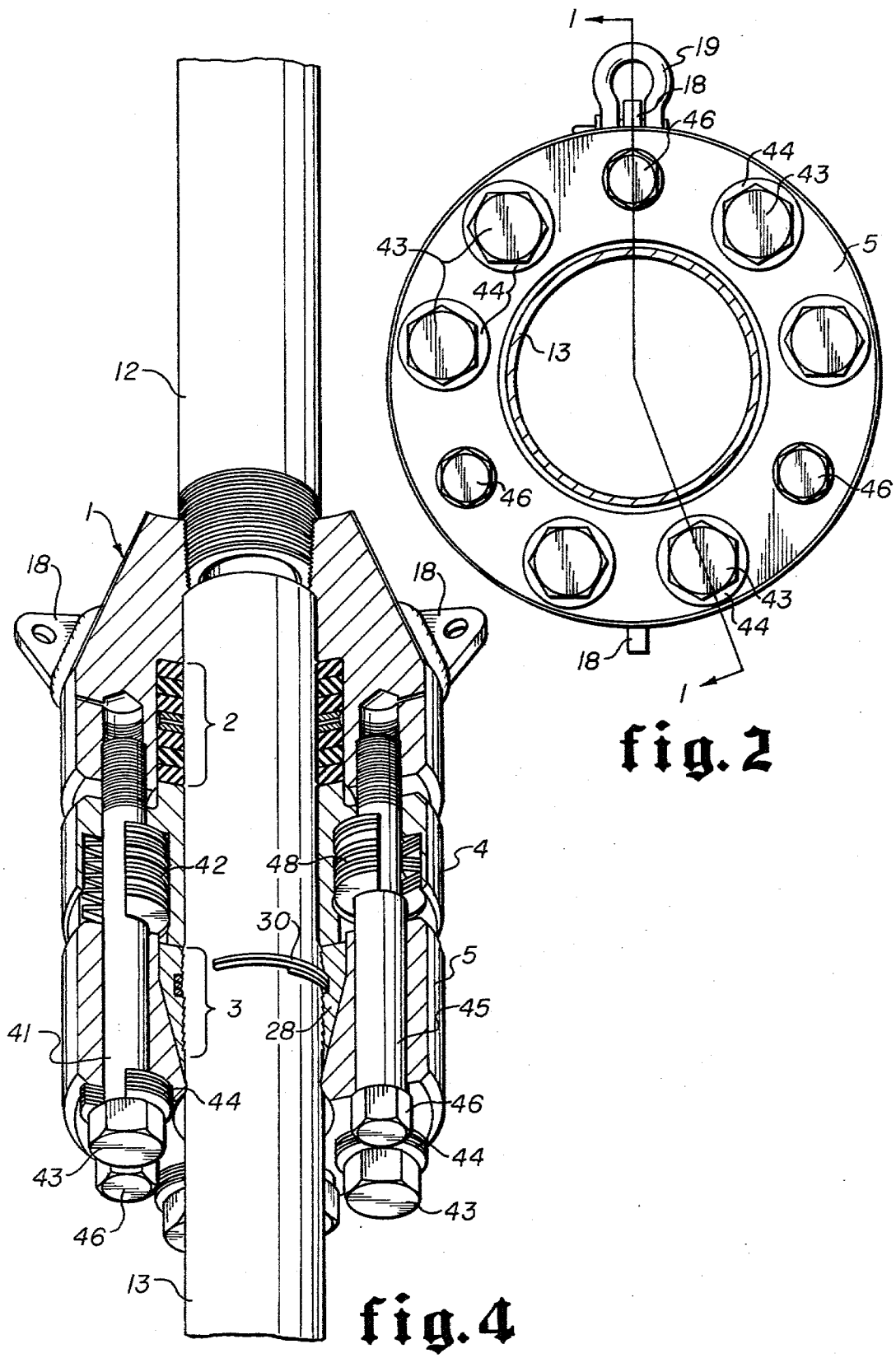
FIG. 2 is an end view of the connector of the present invention.
FIG. 4 is a perspective view of the connector of the present invention, a portion of which has been broken away, illustrating use of the connector of the present invention in a riser installation.

Referring first to FIGS. 1 and 2, there is shown a connector according to a preferred embodiment of the invention. The connector comprises a tubular body 1, an annular seal assembly 2, a gripper assembly 3, seal load ring 4 and gripper load ring 5.

The tubular body 1 may be provided with internal threads 11 for threaded connection with a pipe member 12. The body is counterbored at 12 so as to receive one end of another pipe member 13. The annular shoulder 14 created by the counterbore 12 limits the insertion of the end of pipe member 13 therein. The tubular body 1 is further counterbored at 15 to receive the annular seal assembly 2. Counterbore 15 also provides an annular shoulder 16 against which the seal assembly 2 may bear.

Externally, the body member 1 may be tapered as at 17 to reduce its weight and streamline its appearance. A plurality of lifting eyes 18 may be welded around the tapered exterior of the body member 1 for connection of lifting attachments or the like such as the screw pin anchor shackle illustrated by dotted lines at 19. A plurality of radially disposed and threaded holes 20 whose axes are parallel to the central axis of tubular body 1 are provided at the end of the tubular body 1 opposite the end to which is attached pipe member 12. If desired, the bottoms of these holes may be vented to the surrounding environment by radial ports 21.

Figure 3:
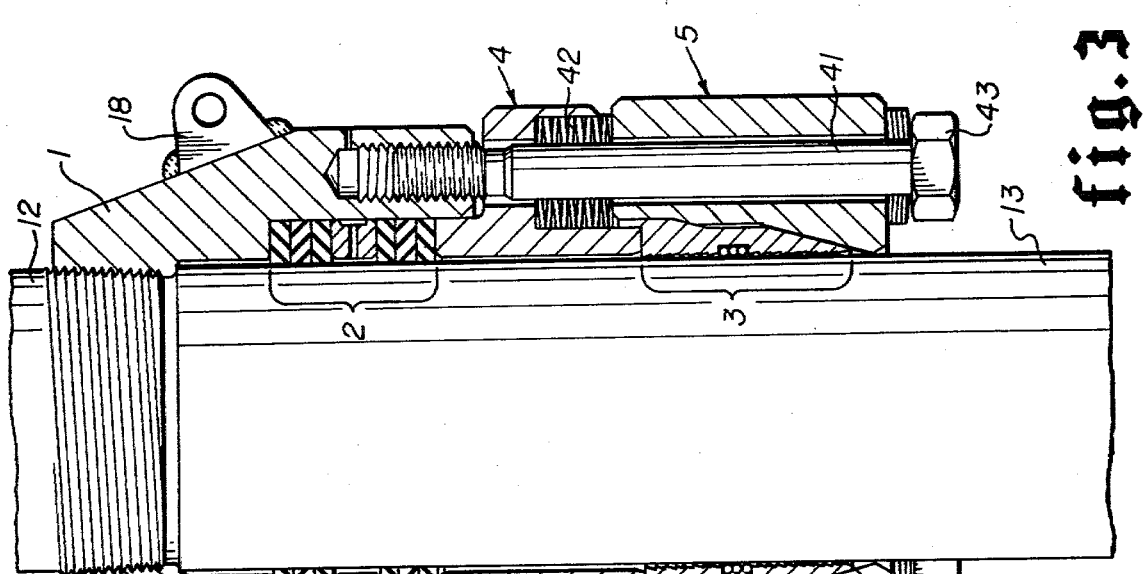
FIG. 3 is a sectional elevation view, similar to FIG. 1, but showing the connector of the present invention in its engaged or set position.

The annular seal assembly 2 is carried by the body 1 within the counterbore 15 between annular shoulder 16 and the seal load ring 4. The seal assembly 2 may comprise a plurality of elastomeric annular seal rings 22 and a lantern ring 23. In the relaxed position shown in FIG. 1, the end of pipe member 13 is freely recewvable therein. However, if an axial force is applied to the seal assembly 2 by the seal load ring 4, the seal rings 22 are movable to a compressed position, causing the internal diameter thereof to contract sealingly engaging the end of the pipe member 13, as shown in FIG. 3.

The seal load ring 4 comprises a cylindrical body portion 24 and a radial flange portion 25. The cylindrical body portion 24 is disposed between the seal assembly 2 and the gripping assembly 3. The flange portion 25 is provided with a plurality of holes 26, the axes of which are coincidental with the axes of threaded holes 20 in the body 1. Holes 26 are counterbored at 27 to receive spring washers as will be more fully understood hereafter. The seal load ring 4, of course, engages the seal assembly 2 and is axially movable relative to the body 1 for moving the seal assembly to the compressed position of FIG. 3, as will be more fully described hereafter.

The gripping assembly 3 may comprise a plurality of slips 28 disposed about the end of pipe member 13 adjacent seal load ring 4. The slips are made in a plurality of segments, for example six segments, so as to allow movement from a radially expanded position (FIG. 1) in which the pipe member 13 may be axially received by and displaced from the body 1, to a radially contracted position (FIG. 3) gripping the exterior of the pipe member 13 and preventing its axial displacement from the body 1. The inner faces of the slip members 28 may be provided with some type of friction means, such as circumferential teeth 29, for more positive engagement with the pipe member 13. So that the slips 28 may operate in unison, the inner faces thereof may also be provided with a circumferential groove in which is placed a wound spring 30. The diameter of the spring 30 is such as to bias the slip members 28 towards the expanded position.

The outer faces of the slip members 28 are tapered. In the particular embodiment shown, this taper is provided by two frustoconical surfaces 31 and 32 joined by a cylindrical surface 33. Another cylindrical surface 34 joins the frustoconical surface 32 to the annular end surface 35 which bears against one end of the seal load ring 4.

The gripper load ring 5 surrounds the gripper assembly 3 and may have a cylindrical exterior 36. The interior surface of the gripper load ring 5 is tapered to correspond with the tapered outer faces of slip members 28. In the particular embodiment shown, these tapers are provided with frusto-conical surfaces 37 and 38 joined by cylindrical surface 39. Like the seal load ring 4, the gripper load ring 5 is also provided with a plurality of holes 40, the axes of which are coincidental with the axes of threaded body holes 20. It should easily be understood that upon axial movement of the gripper load ring 5 in a upward direction, as viewed in FIGS. 1 and 3, the slip members 28 will be moved from the expanded positions of FIG. 1 to the contracted positions of FIG. 3, by virtue of the wedging action between frusto-conical surfaces 31 and 37 and 32 and 38.

The seal load ring 4 and the gripper load ring 5 make up part of an actuating assembly for actuating the seal assembly 2 and gripper assembly 3. The actuating assembly may also comprise a plurality of setting screws 41 disposed, in the illustrated case, in six of the holes 40 and 26 of gripper load ring 5 and seal load ring 4, respectively, and threadedly engaging threaded holes 20 of the body member 1. Surrounding the shank of the setting screws 41 within the seal load ring counterbores 27 is a plurality, ten in the illustrated case, of Belleville spring washers 42 in series arrangement. Surrounding the shank of setting screw 41, between screw head 43 and the end of gripper load ring 5, is a plurality of Belleville washer springs 44 (four in the instant case) in parallel arrangement.

A torque may be applied to the setting screws 41 by engagement with screw heads 43, causing the setting screws 41 to further engage the threaded holes 20. As this is done, it can be easily understood that axially directed forces are simultaneously applied to the seal load ring 4 and gripper load ring 5 via Belleville washer springs 42 and 44, respectively. These axial forces effect the axial movement of seal load ring 4 for moving the seal assembly 2 to the compressed position and axial movement of gripper load ring 5 for moving the gripper assembly 3 to the contracted position. As the setting screws 41 are torqued into further engagement with the threaded holes 20, the Bellville washer springs 42 are compressed biasing the seal load ring 4 in a direction away from gripper load ring 5. At the same time the Belleville washer springs 44 are compressed, biasing the gripper load ring 5 toward body 1.

The actuating assembly may also comprise a plurality of seal screws 45 (three in the instant case) capable of applying additional axial forces to the seal load ring 4 without applying additional axial forces to gripper load ring 5. The seal screws 45 are disposed in selected ones of the holes 40 and 26 in gripper load ring 5 and seal load ring 4, respectively, for threaded engagement with selected ones of the threaded holes 20 in body 1. However, the seal screws 45 are designed slightly differently than setting screws 41. The major diameter of the heads 46 of the seal screws 45 is no greater than the major diameter of its shank so that no shoulder is provided at the head 46 for engaging the end of gripper load ring 5. Thus, no axial force can be applied to the gripper load ring 5 by the seal screws 45. The shank diameter of seal screw 45 is reduced near the seal load ring 4 to provide an annular shoulder 47 encircling the seal screw 45. Between the annular shoulder 47 and the bottom of seal load ring counterbore 27 is a plurality of Belleville spring washers 48 (nine in the illustrated case) some in parallel and some in series. Upon turning or torquing of the seal screws 45 by engagement with their heads 46, an additional axial force may be applied to the seal load ring 4, via Belleville spring washers 48, placing additional compression forces on the seal assembly 2. As already pointed out, no additional forces are applied to the gripper load ring 5. As these axial forces are applied, the Belleville washer springs 48 are compressed biasing the seal load ring 4 toward the seal assembly 2.

STATEMENT OF OPERATION OF A PREFERRED EMBODIMENT

Referring now to FIGS. 1-4, the installation and operation of the connector of the present invention will be described. Although the connector can be used in several pipe joining applications, it will be described as it might be used in repairing a damaged pipe riser which rises from the sea floor above the surface of the water for flow to a manifold system on a platform or the like. In such cases, the most common area of damage is in the splash zone near the surface of the water. For descriptive purposes, it will be assumed that the pipe member 13 represents a riser which has been cut off to remove a damaged area thereabove. The pipe member 12 represents a pipe nipple which may be attached in any suitable manner to another pipe thereabove to complete the riser when connected.

The connector would be lowered from pipe member 12 with its components in the positions of FIG. 1, the seal assembly 2 being relaxed and the gripper assembly 3 being in the expanded position. The upper end of pipe member 13 would be received in the connector until the cut end of the pipe member or riser bottoms against annular shoulder 14 preventing any further movement of the connector in a downward connection.

Then the setting screws 41 would be torqued or turned simultaneously applying axial forces to the seal assembly 2 and gripping assembly 3. As the load increases, the Belleville springs 42 begin to compress, allowing movement of the gripper load ring 5 in the direction of seal assembly 2. This movement results in the inner tapered surfaces of the gripper load ring 5 riding along the tapered outer faces of slip members 28, moving them into the contracted position of FIGS. 3 and 4, wedging the slip member 28 into a fully engaged position with the pipe member 13.

The force transmitted through the compressed Belleville springs 42 causes the seal load ring 4 to move toward seal assembly 2, moving the seal assembly 2 to the extruded and compressed position of FIGS. 3 and 4, in which the elastomeric seal rings 22 sealingly engage the pipe member 13. The energy stored in the Belleville springs 42 serves as a reserve system to maintain compression on the seal assembly 2. If desired or required upon installation or even at a later date, further compression of the seal assembly 2 can be attained by torquing down on the seal screws 45. As already explained, this allows additional compressive force to be applied to the seal assembly 2 without applying additional forces to the gripper assembly 3.

To release the connector, the seal screws 45 and setting screws 41 are merely turned in a reverse direction until the seal assembly 2 and the gripping assembly 3 are in the relaxed and expanded conditions, respectively. The expanding Belleville spring 42, 44 and 48 and the slip spring 30 assure that the components return to the position of FIG. 1, allowing the connector to be removed for recovery, reconditioning, repair or reuse elsewhere.

DESCRIPTION OF AN ALTERNATIVE EMBODIMENT

Figure 5:
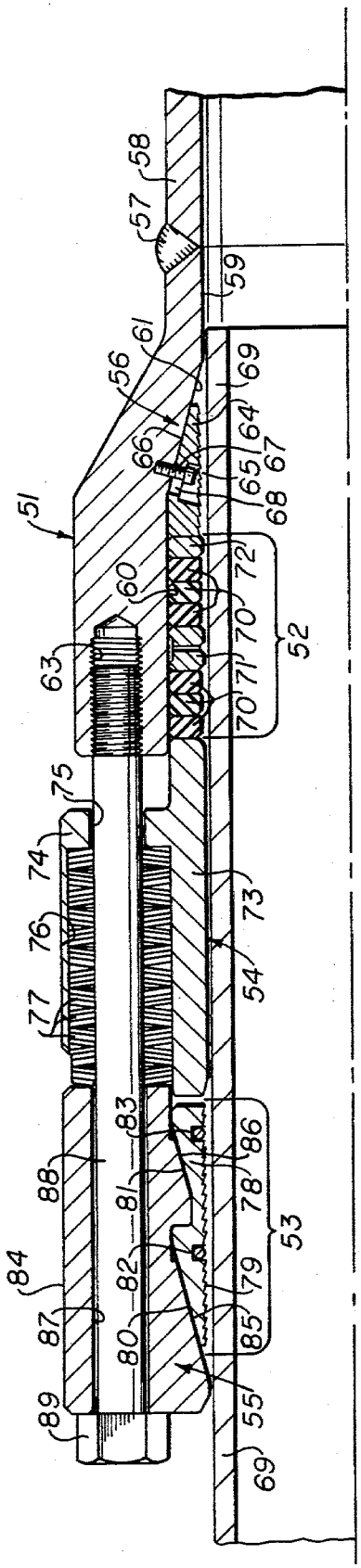
FIG. 5 is a quarter-sectional view of a connector according to an alternate embodiment of the invention, showing the connector in its unset position.
Figure 6:
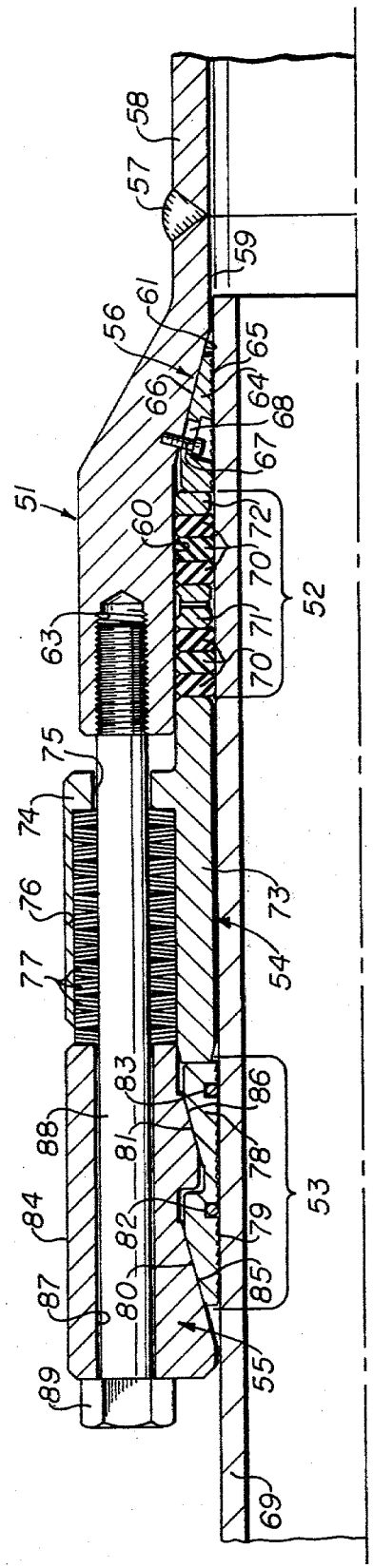
FIG. 6 is a quarter-sectional view, similar to FIG. 5, but showing the connector in its set position.

The previously described embodiment, illustrated in FIGS. 1-4, is primarily designed for riser-type connections. However, the connector of the present invention can be easily adapted for so-called "mid-line" connections, in which the connected pipe members are generally horizontal, such as they might be on the sea floor. The alternate embodiment to be described hereafter with reference to FIGS. 5 and 6, represent such a connector. Like in the first described embodiment, this embodiment also comprises a tubular body 51, annular seal assembly 52, gripper assembly 53, seal load ring 54 and gripper load ring 55. In addition, a second seal assembly 56 may be provided.

The tubular body 51 may be attached in any suitable manner, such as by welding 57, to a pipe member 58. The tubular body 51 is provided with a smooth bore 59 connected to a smooth larger counterbore 60 by frusto-conical or tapered surface 61. Externally, the body member may be tapered as at 62 to reduce its weight and streamline its appearance. Like in the previous embodiment, a plurality of radially disposed and theaded holes 63 whose axes are parallel to the central axis of the tubular body 51 are provided.

The secondary annular seal assembly 56 comprises a plurality of slip members 64 having generally cylindrical interfaces on which may be provided friction engaging teeth 65 and tapered outer faces 66 which rest against correspondingly tapered frusto-conical surface 61 of the body 51. In the initial or unset position, the slip members 64 are held in an expanded position by guide screws 67 threadedly engaging holes in the body member 51 through slots 68 provided in the slips 64. As will be more fully understood hereafter, the slots 68 permit limited movement of the slips 64 along the frusto-conical surface 61 from the expanded position of FIG. 5, in which the end of a pipe member 69 may be freely received therein, to a contracted position, as shown in FIG. 6, firmly engaging the end of pipe member 69.

The annular seal assembly 52 is carried by the body member 51 between the secondary gripping assembly 56 and the seal load ring 54. The seal assembly 52 may comprise a plurality of elastomeric seal rings 70, a lantern ring 71 and a thrust ring 72. In the relaxed position of FIG. 5, the end of pipe member 69 is freely receivable therein. However, if an axially compressing force is applied to the seal assembly 52 by the seal load ring 54, the seal rings 70 are movable to a compressed position, causing the internal diameter to sealingly engage the pipe member 69, as shown in FIG. 6.

The seal load ring 54 comprises a cylindrical body portion 73 and a radial flange portion 74. The cylindrical body portion 73 is disposed between the seal assembly 52 and the primary gripping assembly 53. The flange portion 74 is provided with a plurality of holes 75, the axes of which are coincidental with the axes of threaded holes 63 in the body 51. The holes 75 are counterbored at 76 to receive spring washers 77 similar to the spring washers 42 of the previously described embodiment. The seal load ring 54 is axially movable, relative to the body 51 for moving the seal assembly 52 and the secondary gripping assembly 56 to the set positions of FIG. 6, as will be more fully described hereafter.

The primary gripping assembly 53 may comprise a plurality of slip segments 78 disposed about the pipe member 69 adjacent the seal load ring 54. The slip segments 78 are designed for movement from the radially expanded position of FIG. 5, in which the pipe member 69 may be freely received within or displaced from the body 1, to the radially contracted position of FIG. 6 gripping the exterior of the pipe member 69. The inner faces of the slip segments 78 may be provided with circumferential teeth 79 for positive frictional engagement with the pipe member 69. The outer faces of the slip segments 78 are tapered for cooperation with correspondingly tapered surfaces of the gripper load ring 55. In the particular embodiment shown, this taper is provided by two frusto-conical surfaces 80 and 81. So that the slips 78 may operate in unison, the inner faces thereof may be provided with circumferential grooves in which are placed springs 82 and 83. The free diameter of the springs 82 and 83 are such as to bias the slip member 78 toward the expanded position.

The gripper load ring 55 surrounds the gripper assembly 53 and may have a cylindrical exterior 84. The interior surface of the gripper load ring 54 is provided with tapered areas 85 and 86 corresponding with the tapered surfaces 80 and 81 of the outer face of slip segments 78. Like the seal load ring 54, the gripper load ring 55 is also provided with a plurality of holes 87, the axes of which are coincidental with the axes of the threaded body holes 63. Axial movement of the gripper load ring 55, from the position of FIG. 5 to the position of FIG. 6, will cause the slip segments 78 to be moved from the expanded position of FIG. 5 to the contracted position of FIG. 6, by virtue of the wedging action between the tapered surfaces 80 and 85 and 81 and 86.

The seal load ring 54 and the gripper load ring 55 make up part of the actuating assembly for actuating seal assembly 52, primary gripper assembly 53 and secondary gripper assembly 56. Like in the previous embodiment, the actuating assembly may also comprise a plurality of setting screws 88 threadedly engaging selected ones of the threaded holes 63 of the body member 51. Surrounding the shank of the setting screws 88 are the spring washers 77. The setting screws 88 may be provided with heads 89 for engagement to apply a torque thereto.

STATEMENT OF OPERATION OF AN ALTERNATE EMBODIMENT

Referring now to both FIGS. 5 and 6, the installation and operation of the connector, according to an alternate embodiment of th invention, will be described. Initially, the connector would be joined to the pipe member 58 by such as welding at 57 or the pipe member 58 may actually be a short nipple for connection in any other suitable manner to a section of pipe to be placed in fluid communication with the other pipe member 69.

Initially, all components would be in the unset position of FIG. 5. The end of pipe member 69 would be received within the connector. It is easily understood that since the end of pipe member 69 does not need to bear against a stop shoulder, the connector is capable of a certain amount of longitudinal adjustment thereon to fit the particular circumstances of a midline pipe connection.

After the pipe 69 is in place, the setting screws 88 would be torqued or turned, simultaneously applying axial forces to the primary gripper assembly 53, the seal assembly 52 and the secondary gripper assembly 56 (through the seal assembly 52). As the load increases, the spring washers 77 begin to compress, allowing movement of the seal load ring 54 and the gripper load ring 55 in the direction of the seal assembly 52. This movement results in the outer tapered faces 66 of the secondary gripper segments 64 to move along the tapered body surface 61, causing the secondary gripper assembly 56 to grippingly engage the pipe member 69. At the same time, the seal assembly 52 is being moved to the extruded and compressed position of FIG. 6, in which the elastomeric seal rings 70 sealingly engage the pipe member 69. Simultaneously, the inner tapered surfaces 85 and 86 of the gripper load ring 55 ride along the tapered outer faces 80 and 81 of slip segments 78, moving them into the contracted position of FIG. 6 and wedging the slip members 78 into a fully engaged position with the pipe member 69.

It will be noted that in the engaged position of FIG. 6, the primary gripper assembly 53 engages the pipe member 69 in such a way as to prevent it from being pulled out of the connector while the secondary gripper assembly 56 engages the pipe member 69 so as to prevent further receiving of the pipe member 69 within the connector. Thus, the connection is maintained against both tensile and compressive forces to which it might be subjected.

Although the alternate embodiment has not been described as having them, it can also be provided with separate seal screws, such as seal screws 45 of the embodiment of FIGS. 1-4, so that additional axial compressive forces may be applied to the seal assembly 52 without applying additional forces to the primary gripper assembly 53. Such might be desired if the seal assembly 52 developed a subsequent leak.

To release the connector, the set screws 88 may be turned in a reverse direction until the seal assembly 52 and the gripping assemblies 53 and 56 are in the relaxed and expanded conditions. This would permit removal of the pipe member 69 or of the connector for recovery, reconditioning, repair of reuse elsewhere.

Conclusion

Since the connector of the present invention is a totally mechanical one, it requires a minimum of manpower and equipment backup as compared with other apparatus, especially those used in presently employed welding techniques. The tool is resettable numerous times, easily removed, easily disassembled in the field and reusable.

Although it is contemplated that the connector of the present invention will be set by diver rotation of the setting screws. It can also be set by replacing at least some of the setting screws with studs on which hydraulic tensioning devices might be used. Furthermore, even though the connector has been described for utilization in the repair of a damaged riser and in a midline connection, it can be used in other applications, with or without adaption. Many variations of the invention may be made by those skilled in the art without departing from the spirit of the invention. Therefore, it is intended that the scope of the invention be limited only by the claims which follow.

I claim:

1. Apparatus for connecting a cylindrical first member to a second member comprising:
   tubular body means adapted to receive one end of said first member and having means for connecting said body means to said second member;
   gripping means carried by said body means and movable from a radially expanded position, in which said one end of said first member may be axially received by and displaced from said body means, to a radially contracted position gripping the exterior of said first member and preventing its axial displacement from said body means;
   annular seal means carried by said body means and movable from a relaxed position, in which said one end of said first member may be axially received therein, to a compressed position, sealingly engaging said one end of said first member; and
   an actuating assembly carried by said body means, including a gripper load ring engageable with said gripping means and axially movable relative to said body means for moving said gripping means to said contracted position, and including a seal load ring engageable with said seal means and axially movable relative to said body means for moving said seal means to said compressed position; said actuating assembly including first actuating means for simultaneously applying axial forces to said gripper load ring and said seal load ring for effecting said axial movements thereof and second actuating means for applying axial forces to said seal load ring without applying axial forces to said gripper load ring.

2. Connector apparatus as set forth in claim 1 in which said first actuating means for simultaneously applying said axial forces includes a plurality of screw members passing through radially disposed holes in said gripper and seal load rings for threaded engagement with threaded holes in said body means, said screw members being engageable externally of said apparatus for applying said axial forces to said gripper and seal load ring.

3. Connector apparatus as set forth in claim 2 in which said seal load ring is disposed between said gripper means and said seal means.

4. Connector apparatus as set forth in claim 3 including biasing means between said gripper load ring and said seal load ring biasing said seal load ring in a direction away from said gripper load ring.

5. Connector apparatus as set forth in claim 4 in which said biasing means comprises spring members surrounding at least some of said screw members.

6. Connector apparatus as set forth in claim 3 in which said second actuating means includes a plurality of second screw members passing through radially disposed holes in said gripper and seal load rings for threaded engagement with second threaded holes in said body means, said second screw members being engageable externally of said apparatus for applying axial forces to said seal load ring without applying axial forces to said gripper load ring.

7. Connector apparatus as set forth in claim 6 in which biasing springs are disposed around said second screw members between shoulders provided thereon and said seal load ring.

8. Connector apparatus as set forth in claim 1 in which said second actuating means for applying axial forces includes a plurality of screw members passing through radially disposed holes in said gripper and seal load rings for threaded engagement with threaded holes in said body means, said screw members being engageable externally of said apparatus for applying said axial forces to said seal load ring.

9. Connector apparatus as set forth in claim 1 including second gripping means from said first mentioned gripping means, one of said gripping means resisting tensile forces applied to said cylindrical first member, the other of said gripping means resisting compressive forces applied to said first member.

10. Apparatus for connecting a cylindrical first member to a second member comprising:
    a tubular body adapted to receive one end of said first member and having means for connecting said body to said second member;
    an annular seal assembly carried by said body and movable from a relaxed position, in which said one end of said first member may be axially received therein, to a compressed position, sealingly engaging said one end of said first member;
    a seal load ring engageable with said seal assembly and axially movable relative to said body for moving said seal assembly to said compressed position;
    a gripper assembly axially spaced from said seal assembly and movable from a radially expanded position in which said first member may be axially received by and displaced from said body means, to a radially contracted position gripping the exterior of said first member and preventing its axial displacement from said body;
    a gripper load ring engageable with said gripper assembly and axially movable relative to said body for moving said gripper assembly to said contracted position;
    first actuating means carried by said body means and operation of which simultaneously applies axial forces to said seal load and gripper load rings for moving said seal assembly and said gripper assembly to said compressed and contracted positions, respectively; and
    second actuating means carried by said body means and operation of which applies axial forces to said seal load ring independently of said first actuating means.

11. Connector apparatus as set forth in claim 10 in which said gripper assembly comprises a plurality of slip members, the inner faces of which are provided with friction means for engaging said exterior of said first member and the outer faces of which are tapered, said gripper load ring surrounding said slip members and having a frusto-conical interior surface corresponding with said tapered outer faces of said slips for effecting said movement of said slips to a radially contracted position for said gripping the exterior of said first member upon said axial movement of said gripper load ring.

12. Connector apparatus as set forth in claim 11 in which said seal load ring is disposed between one end of said slips and said seal assembly.

13. Connector apparatus as set forth in claim 12 in which each of said seal and gripper load rings is provided with a plurality of holes radially disposed thereabout whose axes are parallel to the axis of said body member said first actuating means comprising a plurality of screw members disposed in at least a portion of said holes and threadedly engaging coaxially aligned threaded holes in said body member, said screw members being engageable externally of said apparatus for applying said axial forces to said gripper and seal load rings for effecting said axial movements thereof.

14. Connector apparatus as set forth in claim 13 in which said second actuating means comprises a plurality of second screw members disposed in at least a portion of said holes for threadedly engaging coaxially aligned holes in said body member, said second screw members being engageable externally of said apparatus for applying said axial forces to said seal load ring without applying additional axial forces to said gripper load ring.

15. Connector apparatus as set forth in claim 13 including biasing means between said gripper load ring and said seal load ring biasing said gripper load ring and said seal load ring away from each other.

16. Connector apparatus as set forth in claim 15 in which said screw members are provided with heads by which they may be engaged for applying said axial forces to said gripper and seal load rings and including second biasing means between said screw member heads and said gripper load ring biasing said gripper load ring away from said screw member heads.

17. Connector apparatus as set forth in claim 16 in which said first and second biasing means comprises Belleville spring members surrounding said screw members.

18. Connector apparatus as set forth in claim 16 including biasing means between said seal load ring member and shoulders provided on said second screw members biasing said seal load ring in a direction toward said annular seal assembly.

19. Connector apparatus as set forth in claim 18 in which said biasing means comprises Belleville spring members surrounding said second screw members.

20. Connector apparatus as set forth in claim 12 including a second gripper assembly adjacent said seal assembly and movable from a radially expanded position in which said first member may be axially received by and displaced from said body means, to a radially contracted position gripping the exterior of said first member.

21. Connector apparatus as set forth in claim 20 in which said second gripper assembly, in its contracted position, prevents further axial receiving of said pipe member within said body.

* * * * *